June 29, 1926.
V. G. MOSS
CAN OPENER
Filed July 14, 1924
1,590,476
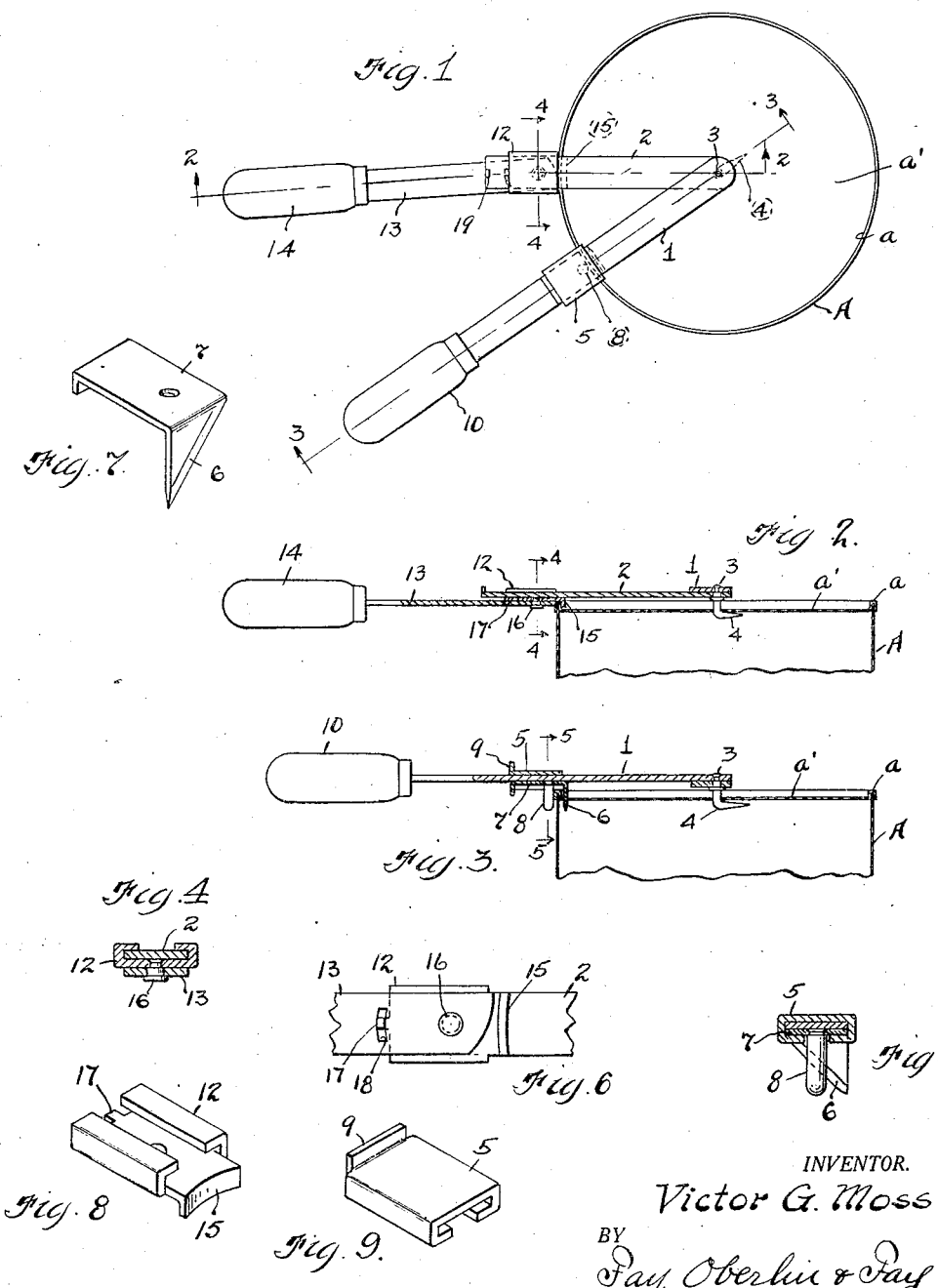
INVENTOR.
Victor G. Moss
BY
Fay Oberlin & Fay
ATTORNEYS Patented June 29, 1926.

1,590,476

UNITED STATES PATENT OFFICE.

VICTOR G. MOSS, OF CLEVELAND, OHIO, ASSIGNOR TO THE CHAMPION REGISTER COMPANY, OF CLEVELAND, OHIO, A CORPORATION OF OHIO.

CAN OPENER.

Application filed July 14, 1924. Serial No. 725,785.

Despite the fact that numerous alternatives have been suggested, the old-fashioned, direct-operating type of can opener still remains in extensive use. This is doubtless due to the fact that it is effective even though dangerous, it being recognized that serious injury to the user not infrequently results from the cutter slipping or from the sharply serrated edges produced by this type of opener, coupled with the necessity of holding the can in one hand while the opener is being operated with the other.

The object of the present invention is to produce a simple and relatively compact tool for cutting the ends from cans and like containers which will relieve the operator entirely from the necessity of thus holding the can with one hand. At the same time the tool is adapted to make a complete circular cut so that the cover can be entirely removed, the cut edge being comparatively smooth instead of irregular or serrated.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a plan view of my improved can opening tool or device shown as applied in operative relation to the top of a can; Figs. 2 and 3 are transverse vertical sections of such tool and can, the planes of the sections being indicated by the lines 2—2 and 3—3, respectively, Fig. 1; Figs. 4 and 5 are similar transverse sections of details of the tool, the planes of such sections being indicated by the lines 4—4 and 5—5, respectively, Fig. 1 (see also Figs. 2 and 3); Fig. 6 is a bottom plan view of one of the operative elements of the tool; and Figs. 7, 8 and 9 are perspective views of certain component parts.

The device consists essentially of two levers in the form of bars or equivalent rigid members pivotally connected together at their inner ends as by a rivet 3, such rivet being extended downwardly to form a stud 4 that is bent at approximately right angles and pointed, as best shown in Figs. 2 and 3. Secured to bar 1, by means of a slide 5, is a cutter 6, preferably of the form shown in perspective in Fig. 7, such cutter being thus made in a separate piece from the slide as a matter of convenience in manufacture since it of course should be fashioned from hardened steel. Riveted or otherwise firmly secured to the body 7 of the cutter is a downwardly projecting stud 8 that is spaced from the cutter a distance sufficient to permit such stud to bear against the outer surface of a can A while the cutter travels closely adjacent the inner edge of the can wall. The slide 5 is provided at one end with an upturned portion 9, whereby it may be conveniently positioned on the bar 1, and the latter is provided at its outer end with a suitable handle 10.

The bar 2 is somewhat shorter than bar 1 but of a length in excess of the maximum radius of the can, on which the device is designed to operate, and mounted on such bar is a slide 12 to which is pivotally attached a third bar 13 that constitutes in effect an extension of said bar 2, said bar 13 being provided at its outer end with a handle 14, similar to handle 10 on bar 1. Slide 12 is provided at its inner end with a downturned flange 15, curved to correspond approximately with the curve of the can body, and the inner end of the bar 13 is convexly curved in the opposite direction, the curve being eccentric with respect to the rivet 16 that pivotally connects said bar 13 to bar 2 (see Fig. 6). The inner end of bar 13 accordingly is adapted to have a cam gripping action on the edge $a$ of the cam body A when flange 15 is located within such edge and bar 13 is rocked about its pivot 16 to cause the curved inner end of said bar to press against such edge from the outside (see Figs. 1 and 2). The pivotal or rocking movement of bar 13 is limited by a lug 17 on the slide 12 that engages a transverse slot 18 in said bar, as shown in Fig. 6. A projection 19 on the upper face of bar 2 serves to prevent the movement of the slide 12 entirely off such bar.

Having thus described the construction of my improved device, the manner of its use will be readily understood. As shown in Figs. 1, 2 and 3, the pointed stud 4 is adapted to be inserted at an approximately central point in the top a' of the can A. For this purpose the lever 1 is held approximately vertically, the pointed stud being thus pressed vertically downwardly onto the top at the desired (i. e. central) point. Slipping is prevented by holding lever 2 firmly in the other hand, and after the stud has been inserted, the pivotally connected levers are thereupon allowed to rest on the edge a of the can. By properly locating slide 5, the cutter 6 is brought to position where it can be forced through the top a' adjacent the edge a, with the stud 8 lying just outside such edge, and at the same time the bar 13 is manipulated to locate slide 12 so that the edge a may be gripped between the inner end of such bar and the flange 15 on the slide at a point circumferentially removed a short distance from the point where the cutter 6 has been inserted. Upon now forcing handles 10 and 14 together, the can edge will be firmly held by the gripping members just referred to and the cutter caused to travel in a clockwise direction, as viewed in Fig. 1, until the bars 1 and 2 are closed upon each other. Thereupon the handle 14 is swung to release such gripping members and a fresh hold is taken on the edge of the can a suitable distance in advance of the new position of the cutter, whereupon the cutter is again forced around and the operation is repeated until the cover A is severed about its entire circumference.

It will be observed that the operator does not have his or her hands at all in close proximity to the cutter or for that matter to the can, the latter being held at some distance so that all danger of an accidental cut is eliminated. At the same time the can is securely held by the tool itself without requiring to be pressed on a table or like support incidentally to the cutting operation. Moreover, it is not necessary for the user to grasp the can even preliminarily when the pointed stud 4 is being inserted, for as explained above, the lever 2, or rather the handled extension thereof, serves as a means for holding the end of the first lever, which carries such stud, in exactly the position desired without danger of slipping.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device for opening cans and the like, the combination of two pivotally connected levers having a projecting pin at their point of pivotal connection adapted to be inserted in an opening in the can top, a cutter adjustable along one of said levers, and can-edge gripping means similarly adjustable along the other lever, said means being automatically actuated upon swinging said levers towards each other.

2. In a device for opening cans and the like, the combination of two pivotally connected levers having a projecting pin at their point of pivotal connection adapted to be inserted in an opening in the can top, a cutter adjustable along one of said levers, and can-edge gripping means similarly adjustable along the other lever, said means including a slide thus adjustable on said lever, a depending flange on said slide adapted to engage inside the can-edge, and a lever extension mounted on said slide oscillatable in the plane of said levers and having its inner end formed to oppose said flange.

3. In a device for opening cans and the like, the combination of cutter-mechanism, and can-gripping means including a lever bar, a slide adjustable thereon, a can-engaging flange on said slide, and a lever extension pivoted to said slide and having its inner end of eccentric form.

4. In a device for opening cans and the like, the combination of two pivotally connected levers having a projecting pin at their point of pivotal connection adapted to be inserted in an opening in the can top, a cutter adjustable along one of said levers, and can-edge gripping means similarly adjustable along the other lever, said means including a slide thus adjustable on said lever, a depending flange on said slide adapted to engage inside the can-edge, a lever extension oscillatorily attached to said slide and having its inner end of eccentric form to oppose said flange, and a stop limiting oscillation of said lever extension.

5. In a device for opening cans and the like, the combination of two pivotally connected levers having a projecting pin at their point of pivotal connection adapted to be inserted in an opening in the can top, a cutter adjustable along one of said levers, a can-edge gripping means similarly adjustable along the other lever, said means including a slide thus adjustable on said lever, a depending flange on said slide adapted to engage inside the can-edge, a handled lever extension pivoted to said slide and having its inner end formed in a curve progressively eccentric in a direction toward the cutter-carrying lever, whereby an automatic gripping action results when in use, a guide slot in said lever extension, and a stop lug projecting from the slide into said slot.

6. In a device for opening cans and the like, the combination of two pivotally connected levers having a projecting pin at their point of pivotal connection, said pin including an angular pointed portion adapted to pierce the can top and allow such pin to be inserted, a slide adjustable along one of said levers, a cutter carried by said slide, a stud on said slide spaced from said cutter and adapted to bear against the outside of the can when said cutter engages the top of the latter, and can-edge gripping means similarly adjustable along the other lever.

Signed by me, this 10th day of July, 1924.

VICTOR G. MOSS.